H. A. THOMAS.
DRYING RACK.
APPLICATION FILED MAY 10, 1913.
1,080,086.
Patented Dec. 2, 1913.
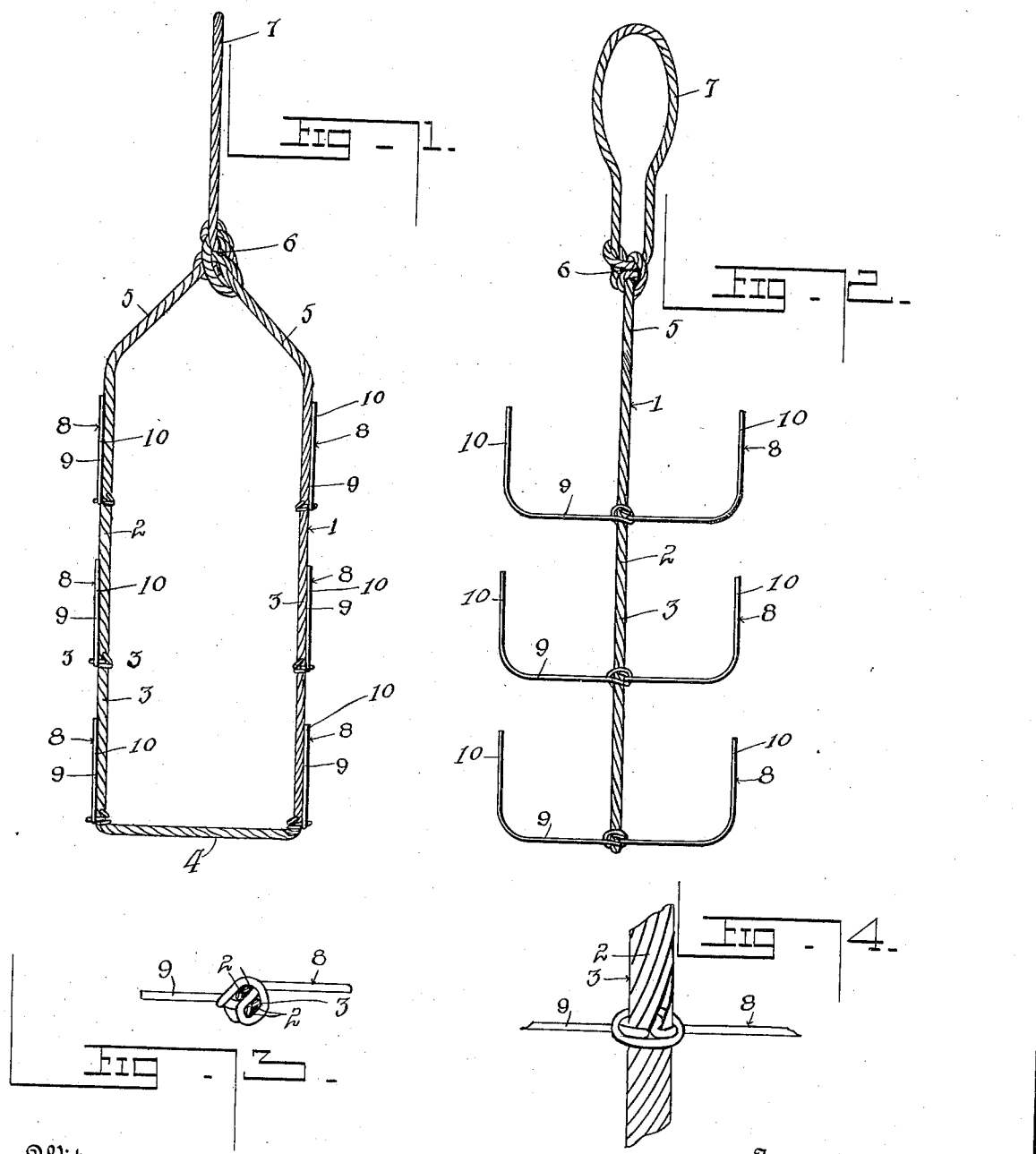

UNITED STATES PATENT OFFICE.

HERBERT A. THOMAS, OF BELLAIRE, MICHIGAN.

DRYING-RACK.

1,080,086.  Specification of Letters Patent.  Patented Dec. 2, 1913.

Application filed May 10, 1913. Serial No. 766,766.

*To all whom it may concern:*

Be it known that I, HERBERT A. THOMAS, a citizen of the United States, residing at Bellaire, in the county of Antrim, State of Michigan, have invented certain new and useful Improvements in Drying-Racks; and I do hereby declare the following to be a full, clear, and exact description of the invention, such as will enable others skilled in the art to which it appertains to make and use the same.

This invention is directed to improvements in drying racks for supporting seed corn on the ear.

The invention has for its object to so construct an article of this character so that the seed corn can be readily applied to the rack in a green condition, and will be so supported that the ears will not touch, thereby allowing the ears to dry effectually.

A further object of the invention is to so construct a rack of this type so that the same can be readily suspended so that the same will be out of the way of rats, mice or vermin.

With these and other objects in view, this invention resides in the novel features of construction, formation, combination and arrangement of parts to be hereinafter more fully described, claimed and illustrated in the accompanying drawing, in which:—

Figure 1 is a front view of the device. Fig. 2 is a side elevation of the same. Fig. 3 is an enlarged sectional view of one of the vertical arms. Fig. 4 is an enlarged fragmentary side elevation of one of the vertical arms.

The rack comprises a frame 1 which is formed from a plurality of single length wire strands 2, which are twisted together, and are so bent as to provide vertical arms 3, the lower ends of which being connected by a horizontal bar 4, the upper ends of the arms 3 are curved inwardly, as at 5, and are twisted together, as at 6. One of the arms is of greater length than the other and terminates in a loop 7, one end of which is twisted at the meeting ends of the curved portions of the arms 3, said loop serving as means for engaging a nail or the like for suspending the same.

The supports 8 for the ears are formed from single lengths of wire 9, which are passed between the strands 2, and are then twisted at their central portions around the arms 3 so as to produce upwardly curved arms 10, which project upon opposite sides of the arms 3. The supports 8 are arranged in vertical spaced relation so that when ears of corn are supported thereby, the same will not touch, and will be disposed in horizontal positions.

From the foregoing description it will be seen that a rack has been provided for supporting ears of corn so that the same will be out of contact, and the danger of accidental disengagement of the ears from the supports is positively prevented, as the ears are supported at both ends. Further a rack constructed in this manner affords free circulation of air around the ears, thus insuring a thorough drying and curing of the same, and by providing the loop 7, the same can be suspended so that damage by rats, mice or vermin is prevented.

What is claimed is:—

A drying rack of the class described comprising a frame consisting of a plurality of wire strands twisted together and so bent as to provide vertical arms, the lower ends of which are connected by a horizontal arm, said arms having their upper ends twisted together, one of said arms being of greater length than the other, whereby the long arm may be bent to provide a loop for suspending the rack, the supports formed from single lengths of wire which are passed between the strands forming the arms and twisted at their centers, said supports having curved arms for engaging the opposite ends of ears of corn.

In testimony whereof, I affix my signature, in the presence of two witnesses.

HERBERT A. THOMAS.

Witnesses:
C. E. DENSMORE,
C. B. TURNER.